Oct. 20, 1959  I. S. LAWSON  2,909,138
METHOD FOR CONTINUOUSLY PRODUCING STRIPS OF MOLDING
OF PREDETERMINED LENGTH FROM AN
ENDLESS METAL RIBBON
Filed Sept. 23, 1953
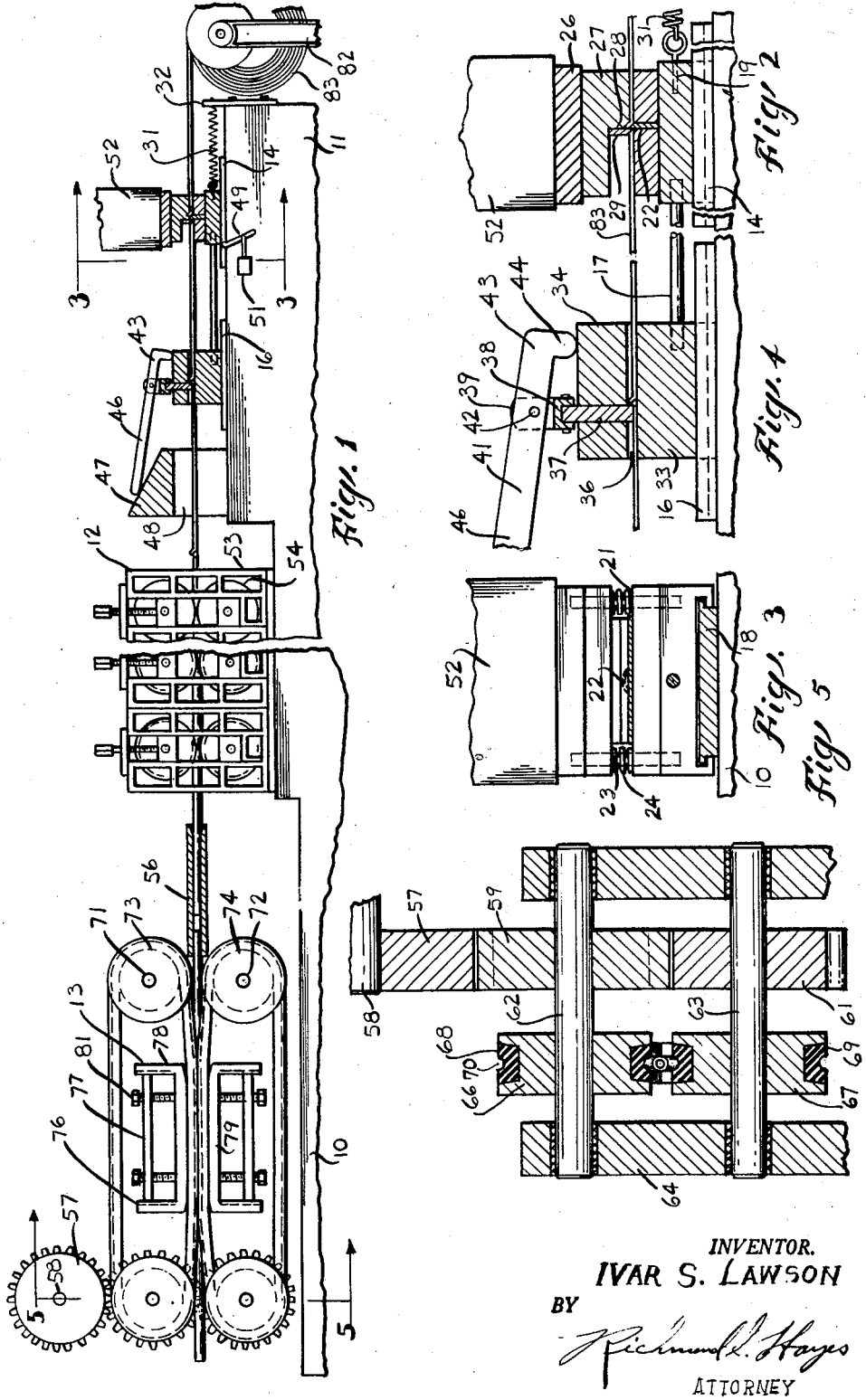
INVENTOR.
IVAR S. LAWSON
BY
ATTORNEY United States Patent Office 2,909,138
Patented Oct. 20, 1959

2,909,138

METHOD FOR CONTINUOUSLY PRODUCING STRIPS OF MOLDING OF PREDETERMINED LENGTH FROM AN ENDLESS METAL RIBBON

Ivar S. Lawson, Ashville, N.Y.

Application September 23, 1953, Serial No. 381,920

4 Claims. (Cl. 113—116)

This invention relates to a device and method for continuously producing strips of molding of predetermined length from an endless metal ribbon. More particularly, the invention discloses a device which continuously produces accurately measured indications on an endless metal ribbon, forms the ribbon into desired cross sectional shape and successively severs the molded ribbon at the measured indications.

Strips of molding are commonly used for many purposes such, for example, as trim or framing for doors and windows. Conventionally, the stock from which the strips are formed is of the nature of a spool or reel of metal ribbon. The ribbon is fed through the suitable forming dies to give it desired shape. As the shaped ribbon leaves these dies, it is measured into lengths and cut. A variety of means has heretofore been employed for measuring the length of the strips but these strips have generally been cut at the measured indications by some type of hand or power saw. When speed of production, coupled with accuracy, is required, it has not been found entirely satisfactory to measure and cut the material as it progresses from the forming dies. This has partly been due to the normally rather slow movement of a carriage by which to make the measured indications, the time taken for the saw to cut through the formed material and return of the carriage to the point of starting successive measurements.

To increase the rapidity with which molded strips may be made from metal ribbon stock and each strip be of identical length with other strips, it is proposed to measure and mark such measurements by scoring and partially cutting the material when it is in ribbon form and prior to passing through the forming dies. Such scoring and partial cutting, however, does not so weaken the strip as to in any way affect its movement through the forming dies and, thus, the material emerges from the forming dies as a continuous strip of desired cross sectional contour, with the scored and cut points providing the only weakness. At the place of emergence of the formed material from the forming dies, it passes into a structure that provides a combined gripping and pulling action. The movable parts of this structure, to pull or draw the formed strip into it, operate preferably at a speed approximately twice the speed of the feed through the forming dies. Thus, this structure serves to pull the material apart at its point of weakness and a strip of molding of given length is produced. The rate of feed or pull of this structure causes the severed strip to move quickly out of the way and the new end of the formed material enters the structure to be pulled away as a separate strip as soon as the weakened, measured area leaves the forming dies.

The objects and advantages of the invention reside particularly in the production of a single device and method for the continuous fabrication of accurately measured lengths of formed material. The device enables accurate, uniform production of strips of molding, rapid production of such strips, and economical production due to the fact that from the time the material, in ribbon form, enters the device, there is no handling until each measured, strip of molding emerges from the other end of the device.

Other advantages of the invention, such as its simplicity of structure and arrangement of parts, will be more fully understood from a consideration of the following specification, taken in conjunction with the accompanying drawing, wherein Fig. 1 is a side elevational view of the invention showing the ribbon measuring structure, broken away forming dies, and strip severing structure;

Fig. 2 is an enlarged fragmentary vertical sectional view of the scoring and cutting die shown in Fig. 1;

Fig. 3 is a fragmentary vertical view, partly in section, being taken substantially on the line 3—3 of Fig. 1;

Fig. 4 is an enlarged fragmentary vertical sectional view of the trip mechanism forming a part of the measuring structure and shown in Fig. 1; and Fig. 5 is an enlarged fragmentary vertical sectional view taken substantially on the line 5—5 of Fig. 1 and shows details of the severing structure.

Referring more particularly to the drawing, the reference numeral 10 is employed to generally designate a bed or stand on which the entire structure of the invention is mounted. For purposes of description, the device may be considered as consisting of three units; namely, a measuring and indicating unit 11, forming dies 12, and severing unit 13. The measuring and indicating unit 11 consists of two parts, 14 and 16, which, through their rigid connection by one or more rods 17 of predetermined length, are adapted to move as one along a guide 18 carried by the bed 10. Part of base 14 supports a lower die 19 which consists of a plane, upper surface 21 from which rises a central projection 22. Upstanding guide rods 23, carried by the part 14, serve to locate the lower die 19 and are enclosed by springs 24 that seat at one end in apertures in the lower die. An upper die 26 includes a depending portion 27 that is generally L-shaped in cross section. Centrally of the lowermost portion of the die is a depression which is adapted to align with the projection 22 of the lower die when the dies meet. In the forward edge 28 of the lower portion is located a cutter 29, the edge thereof extending slightly below the central depression above referred to. The rods 23 terminate at their upper ends in the die 26 and the upper ends of springs 24 are seated in suitable apertures in this die. One end of the lower die 19 is connected by a spring 31 with an end plate 32 attached to the end of the unit 11. Any movement of the dies along the guide 18 in one direction sufficiently tensions the spring 31 so that, when the force, by which the dies are moved, is relieved, the spring will return them to the end of their travel on guide 18.

The part 16 includes a block 33 that is mounted for slidable movement on a further guide or a continuation of guide 18. Secured in any suitable manner to the upper face of the block 33 is a further block 34. The under face of this block has a full length recess which combines with block 33 to form a shallow lengthwise passageway 36. Projecting downwardly through a central slot in block 34 is a stop plate 37. This plate projects above block 34 and into the depending yoke 38 of a connector 39. A pin or other suitable means is employed to secure these parts together. The upper part of the connector is also formed with a yoke disposed at right angles to the depending yoke and this last mentioned yoke mounts a lever 41 by means of a pivot pin 42. The lever 41 is not centered and thus includes a short arm 43 which terminates in a depending finger 44 that overlies the block 34. The long arm 46 of the lever rests upon an incline of a block 47 that is permanently attached to the base of the unit 11. Block 47 is of the nature of a bridge and thus includes a horizontal passageway 48 therethrough. The incline of the block 47 faces the unit 11 and serves as a rest for the free end of arm 46, forming part of the lever 41. As already brought out, parts 14 and 16 are connected by one or more rods 17 which cause them to move as one along the guide 18. It will be understood that rods 17 may be removed and replaced by longer or shorter rods in order that the space between the parts 14 and 16 may be altered for operational purposes.

A trip 49 is mounted on the unit 11 and has operative connection with a switch 51. This switch is in the electrical circuit of a conventional press and, when closed, releases a ram 52 thereof for reciprocal movement. Presses of the type suitable for use with this invention are of conventional structure and frequently actuated by closing the switch of a circuit that controls the press clutch release. Thus, only a portion of the ram of such a press is disclosed, together with an operative switch.

The forming dies 12 are mounted in a frame 53 which supports suitable forming rolls 54. As is conventional in this structure, the rolls 54 may be adjusted toward or away from each other and may be removed entirely and replaced with other rolls by which to give different contour and cross sectional shape to a continuous flat strip of metal ribbon that is passed through them. It is important to know that the path or direction for the ribbon, through the forming dies, is in the plane of the path of the ribbon through the measuring and indicating unit 11.

Attention is now directed to the severing unit 13 which is also mounted on the bed or stand 10. Adjacent the exit end of the forming dies 12 is a guide 56. This guide is suitably mounted in the path of the continuous strip of molding. In the present disclosure, the continuous strip is formed by the dies 12 into a tube and thus the guide 56 is shaped to receive and allow passage of this tube therethrough. It is intended, however, that the guide 56 be removable and replaceable to provide an accurate guideway for a strip of molding other than of tubular form. The guide, it will be noted, is somewhat flared, as suggested in the drawing, in order that the formed material will not jam but pass freely into it.

At the other end of the guide 56 is located the operative structure of the severing unit. This structure, although not shown as mounted on the bed 10, is actually supported thereby in any conventional manner. However, since this unit must be capable of acting upon formed material other than that of the tubular form shown, the parts thereof, of necessity, will be changed from time to time and, therefore, details of the support are of no import to the present invention. The severing unit is driven from any suitable power source by means of a gear 57 mounted on a shaft 58. In the present instance, gear 57 drives a further gear 59, which in turn meshes with a still further gear 61. Gears 59 and 61 are mounted on fixed shafts 62 and 63, respectively, and are in a common vertical plane. The shafts 62 and 63 have suitable end bearing support in walls 64 which, for the purpose of the present disclosure, may constitute the side walls of the enclosure for the severing unit. Between one of the walls 64 and the adjacent gears, the shafts mount pulleys 66 and 67. These pulleys carry gripping belts 68 and 69. Keeping in mind that the invention is shown for use in connection with tubular molding, the belts are formed, on their outer surfaces, with transversely centered, semi-circular recesses 70. The opposite or inner surface of each of the belts is, of course, wedge-shaped to fit the corresponding contour of the outer surface of the pulleys 66 and 67. At its inner end the unit includes a further pair of shafts 71 and 72 which are also suitably supported by the walls 64 and these shafts mount additional pulleys 73 and 74. These last mentioned pulleys are identical with pulleys 66 and 67 and are so located as to normally hold the belts reasonably taut.

Intermediate the ends of the severing unit, and located vertically between the free portions of each of the belts, is a shoe 76. There are two of these shoes and, although reversely arranged, they are identical, both as to structure and use and, therefore, only one will be described. A cross plate 77 is supported by the walls 64. Suitable lugs, at the ends of the cross plate, engage grooves in the upright ends 78 of the shoes. This combination of groove and lug provides a guide for movement of the shoe toward or away from the belt. The ends of the base wall 79 of the shoe are slightly beveled or rounded to prevent damage to the belt. Two or more threaded openings are provided in each plate 77, through which screws 81 project. The screws may be turned down into engagement with the inner face of the base wall of the shoes to cause them, in their entirety, to move into pressure engagement with the belt. Although not shown, any suitable means, such as springs, may be provided to withdraw the shoes from their proximity with the belts when the screws are backed off.

To more fully understand the structure of the invention and the method of operation by which an endless metal ribbon may be measured, formed, and cut to measurement, the following brief description is presented. A conventional stand 82 mounts a reel of metal ribbon 83. This ribbon is hand fed into the measuring and indicating unit 11 between dies 19 and 26, and thence into the passageway 36. The stop plate 37 may interfere with passage of the ribbon but this is immaterial inasmuch as this hand operation is primarily to set the device up for subsequent automatic operation. The unit, as a whole, is now manually moved from one extreme end of travel at the right to its extreme position to the left, as viewed in the drawing. Die 19, during this movement, contacts trip 49, closing the switch 51 and actuating the ram 52. The dies, being directly beneath the ram at this time, will be brought together, forming, in the ribbon, a transverse projection or blister. The blister, due to the design of this portion of the die, is partially cut from the ribbon and includes a raised edge that is in the direction of the ribbon's travel. Simultaneously with forming the blister, the dies have produced a full width transverse cut in the ribbon. The depth of this cut may be varied by adjustment of the die parts, but it will be understood that the ribbon is not severed nor rendered so weak that the subsequent forming operation would be jeopardized. The cut is in line with the cut edge of the blister and thus it appears that the ribbon actually receives a deep, transverse scoring with a small centered severance.

The ram, of course, has immediately returned to raised position and in doing so permits the action of springs 24 to separate the dies. This unit, during travel, has expanded spring 31 which now functions to return the unit to its original position. Further hand feeding the ribbon brings the blister into contact with the block 37. As the ribbon is further moved, parts 14 and 16 move and, thus, arm 46 rides up the incline of block 47 and, with the finger 44 as a fulcrum, the lever now lifts plate 37 to a position above the blister. This movement serves two purposes; namely, to permit continued feeding of the ribbon through the block 34 and allow the spring 31 to return the unit to its original position. As the unit returns, lever 41 moves down the incline of the block 47 and allows the stop plate 37 to again rest on the upper surface of the ribbon where it will be in position to be contacted by the next blister.

The entry rollers 54 of the forming dies 12 are power driven and, when the end of the ribbon is fed into these dies, automatic operation of the structure commences and the ribbon will be continually unrolled, blistered, and partly severed, as already described, measured in accordance with the spacing of stop plate 37 and the cutter 29, and travel through the forming dies. Upon the entry of the ribbon into the dies, the first set of rollers flattens the blister. This is to enable accurate forming of the ribbon and also because the usefulness of the blister as a measurement is ended. As presently disclosed, the ribbon is to become a tube and so the rolls 54 are arranged in conventional manner for this purpose. The formed ribbon or tube now leaving the forming dies has been measured into lengths and such lengths indicated or designated by the scoring and partial cuts in the ribbon above described. Although these cuts are of insufficient depth to affect the ribbon as it passed through the dies, they are, nevertheless, sufficient to enable breaking or tearing the tube at the cut points. It is proposed to drive the belts 68 and 69 at a rate of speed substantially twice the speed of travel given the ribbon by the power driven rolls 54. The belts have been adjusted by the shoes 76 to a position such that their adjacent surfaces, intermediate the supporting end pulleys, are in contact with each other. The tube enters the guide 56 which in turn projects the tube into the somewhat open space of the severing device between pulleys 73 and 74. As the tube continues to be fed into this unit, the belts will begin to affect a partial grip thereon, and as the tube moves to a position between that portion of the belt backed by the shoes, a complete and substantial grip occurs. Inasmuch as the belts are traveling at a much greater rate of speed than the tube as it leaves the forming dies, the tube is pulled upon by the belts and when this pull becomes sufficiently great, the tube is severed at the point previously scored or cut and the section thus severed quickly moved out of the unit. Shortly the new end of the tube will move out of the guide 56 and into the severing unit and the severing operation repeated when the weakened or partially cut place in the tube approaches the gripping belts.

From the foregoing it will be apparent that through the use of the above set out device, a sequence of operations are caused to take place which transform an endless metal ribbon into accurately measured sections of tubular molding. It will be clearly apparent that the methods and structures for measuring and indicating and severing lend themselves to very rapid operation, the speed of which being only limited by the rapidity with which the forming dies 12 can change the ribbon into desired cross sectional shape.

It will be understood that any obvious departures from the exact embodiment of the invention described above may be made without departing from the spirit and scope of the annexed claims.

Having thus set forth my invention, what I claim as new and for which I desire protection by Letters Patent is:

1. The method of continuously producing formed articles of measured length and pre-determined cross-sectional shape from strip stock comprising the steps of continuously longitudinally moving the strip stock, partially pre-cutting the strip for subsequent break-off by simultaneously transversely grooving and producing an open edge temporary projection in the strip stock, measuring a succeeding length of strip stock from the preceding open edged projection equal to the length of a finished article for a repetition of the previous step, passing the grooved strip through a first forming stage to flatten the temporary projections and through successive forming stages to form the strip into desired cross-section, supporting and guiding the moving formed material into a break-off unit, and breaking the formed material into individual finished articles at successive grooves.

2. The method according to claim 1 in which the breaking is accomplished by a combined gripping and pulling action.

3. The method of continuously producing formed articles of measured length and pre-determined cross-sectional shape from strip stock comprising the steps of continuously longitudinally moving the strip stock, preparing the strip for subsequent break-off by transversely slitting the strip intermediate its marginal edges to produce an open edged temporary projection, transversely impressing one face of the strip to form a groove extending transversely of the strip from the ends of the slit to the edges of the strip, measuring a succeeding length of strip stock from the preceding open edged projection equal to the length of a finished article for a repetition of the preceding step, repeating the preceding steps to provide a strip of groove connected blanks of pre-determined uniform length, passing the groove connected blanks through a first forming stage to flatten the temporary projections and through successive forming stages to form the strip into desired cross-section, supporting and guiding the moving formed material into a break-off unit, and breaking the formed material into individual finished articles at successive grooves.

4. The method according to claim 3 in which the temporary projection and transverse groove is produced simultaneously in which the breaking is accomplished by a combined gripping and pulling action.

References Cited in the file of this patent

UNITED STATES PATENTS

| Number | Name | Date |
|---|---|---|
| 1,835,002 | Birckmayer | Dec. 8, 1931 |
| 2,024,485 | Sussman | Dec. 17, 1935 |
| 2,087,806 | McCune | July 20, 1937 |
| 2,127,618 | Riemenschneider | Aug. 23, 1938 |
| 2,177,104 | Gonser | Oct. 24, 1939 |
| 2,222,842 | Humphrey | Nov. 26, 1940 |
| 2,234,999 | Yoder | Mar. 18, 1941 |
| 2,249,325 | Pruckner | July 15, 1941 |
| 2,327,894 | Hodgson | Aug. 24, 1943 |
| 2,444,463 | Nordquist | July 6, 1948 |
| 2,510,788 | Willet | June 6, 1950 |
| 2,541,232 | Forster | Feb. 13, 1951 |
| 2,582,062 | Peters | Jan. 8, 1952 |